(12) United States Patent
Safavi et al.

(10) Patent No.: US 8,588,206 B2
(45) Date of Patent: Nov. 19, 2013

(54) METHOD AND SYSTEM FOR ASSIGNING REFERENCE SIGNALS IN A MULTI-ANTENNA CONTEXT

(75) Inventors: Anahid Robert Safavi, Kista (SE); Jianghua Liu, Beijing (CN); Mattias Wennström, Uppsala (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 13/197,420

(22) Filed: Aug. 3, 2011

(65) Prior Publication Data

US 2011/0286548 A1    Nov. 24, 2011

Related U.S. Application Data

(63) Continuation of application No. PCT/IB2010/000638, filed on Feb. 15, 2010.

(30) Foreign Application Priority Data

Jun. 22, 2009  (WO) ................ PCT/CN2009/072388

(51) Int. Cl.
*H04B 7/212*    (2006.01)

(52) U.S. Cl.
USPC .......... 370/347; 370/345; 370/310; 370/344; 375/295; 375/299

(58) Field of Classification Search
None
See application file for complete search history.

(56) References Cited

U.S. PATENT DOCUMENTS

| 2006/0023680 A1 | 2/2006 | Oh et al. | |
|---|---|---|---|
| 2007/0140208 A1* | 6/2007 | Varikat | 370/345 |
| 2008/0037409 A1* | 2/2008 | Ogawa et al. | 370/201 |
| 2008/0080632 A1* | 4/2008 | Kim et al. | 375/267 |

(Continued)

FOREIGN PATENT DOCUMENTS

| CN | 1981467 A | 6/2007 |
|---|---|---|
| CN | 101421958 A | 4/2009 |

(Continued)

OTHER PUBLICATIONS

Office Action and Search Report issued in corresponding Chinese Patent Application No. 201080004447.6, mailed Oct. 12, 2012.

(Continued)

*Primary Examiner* — Anez Ebrahim
(74) *Attorney, Agent, or Firm* — Brinks Gilson & Lione (57) ABSTRACT

A method and system of assigning reference signals to antennas and nodes in a wireless communication system, the wireless communication system comprising N number of transmitting nodes, wherein N is an integer N≥1, is disclosed. The transmitting nodes are transmitting reference signals in a first slot and a second slot within sub-frames, over the same bandwidth. Each transmitting node has at least one transmit antenna, wherein different nodes can have different number of transmit antennas. The reference signals are of two different types, a first type of reference signals used for demodulation, and a second type of reference signals used for measurements. According to the method, reference signals of the first type is assigned to a number of transmitting nodes with at least one transmit antenna in the first and second slot in a predefined bandwidth; and reference signals of the second type is assigned to at least one transmitting node with at least transmit antennas in at least one of the first and second slot in a predefined bandwidth.

18 Claims, 7 Drawing Sheets

(56) References Cited

U.S. PATENT DOCUMENTS

2008/0232325 A1   9/2008  Mehta et al.
2008/0260058 A1*  10/2008 Li ................................ 375/260
2009/0034505 A1   2/2009  Papasakellariou et al.
2009/0310549 A1* 12/2009  Higuchi et al. ............... 370/329

FOREIGN PATENT DOCUMENTS

| WO | WO 2007/117127 A1 | 10/2007 |
| --- | --- | --- |
| WO | 2008/093952 A2 | 8/2008 |
| WO | 2009/017363 A2 | 2/2009 |
| WO | 2009/020983 A1 | 2/2009 |

OTHER PUBLICATIONS

Office Action issued in corresponding European Patent Application No. 10791690.0, mailed Apr. 30, 2013.

Extended European Search Report issued in corresponding European Patent Application No. 10791690.0, mailed May 8, 2012.

Written Opinion of the International Searching Authority issued in corresponding PCT Patent Application No. PCT/IB2010/000638, mailed Jul. 22, 2010.

Written Opinion of the International Searching Authority issued in corresponding PCT Patent Application No. PCT/CN2009/072388, mailed Mar. 25, 2010.

$3^{rd}$ Generation Partnership Project; Technical Specification Group Radio Access Network; Evolved Universal Terrestrial Radio Access (E-UTRA); Physical Channels and Modulation (Release 8). GPGG TS 36.211. Mar. 2008.

International Search Report issued in corresponding PCT Application No. PCT/CN2009/072388; mailed Mar. 25, 2010.

International Search Report issued in corresponding PCT Application No. PCT/IB2010/000638; mailed Jul. 22, 2010.

* cited by examiner

METHOD AND SYSTEM FOR ASSIGNING REFERENCE SIGNALS IN A MULTI-ANTENNA CONTEXT

CROSS-REFERENCE TO RELATED APPLICATIONS

This application is a continuation of International Application No. PCT/IB2010/000638, filed on Feb. 15, 2010, which claims priority to International Application No. PCT/CN2009/072388, filed on Jun. 22, 2009, both of which are hereby incorporated by reference in their entireties.

FIELD OF DISCLOSURE

The present disclosure relates to a method and system of assigning reference signals to antennas and nodes in a wireless communication system. Computer program therefore may also be of relevance.

BACKGROUND

In a communication system, different categories of reference signals are used. One category of reference signals is used to estimate the channel which is needed to enable coherent demodulation of received signal containing both control and data information. Another category is used for channel quality measurements and enabling scheduling.

For example, in the 3GPP ($3^{rd}$ Generation Partnership Project) LTE (Long Term Evolution) uplink, reference signals which are used for coherent demodulation are called demodulation reference signals (DRS) and reference signals which are used for channel quality measurements are called sounding reference signals (SRS).

Both SRS and DRS reference signals in LTE are decomposed of a cell specific base sequence with a predefined length and a corresponding cyclic shift in time domain. In LTE uplink, the base sequence is a Zadoff-Chu (ZC) or a Computer Generated (CG) sequence. The ZC sequence is used as the base sequence when the length of the base sequence is larger than 24 sub carriers. Otherwise Computer Generated (CG) sequence is used. These two kinds of sequences have the advantage of having constant amplitude in time and frequency domain, which is desired for uplink reference signal (RS). Cyclic shift is a linear phase rotation in frequency domain applied to the base sequence. This linear phase shift in frequency domain is equivalent to a cyclic shift in time domain. Different values of cyclic shifts are used to generate different orthogonal reference signals within one cell, from one base sequence.

In a multi user communication system, where several users with one transmit antenna transmit simultaneously in the same band, as in LTE uplink DRS corresponding to multi-user MIMO or LTE uplink SRS, one cyclic shift is used to generate reference signal of each user. As the reference signals corresponding to users are orthogonal, cyclic shift value and reference signal can be used to separate different users at the receiver side.

Figure 1:
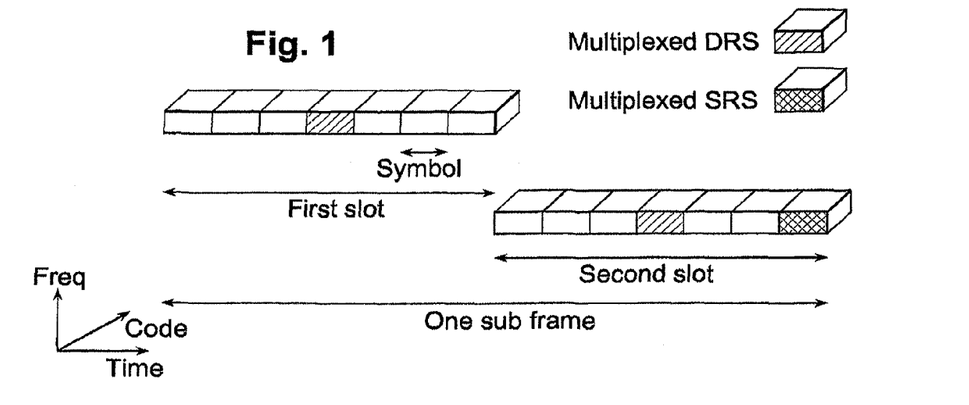
FIG. 1 shows an illustration of DRS and SRS position in the uplink sub frame of LTE.

In the LTE uplink, predefined and distinct symbols in the uplink sub-frame are dedicated to transmit reference signals (RS), which is illustrated in FIG. 1. In the case of normal Cyclic Prefix (CP), DRS occupies the 4th symbol of each uplink slot and SRS is transmitted in the last symbol of some sub-frames which are configured by eNB. The transmission of DRS and SRS for each user equipment (UE) is independent. If one UE is scheduled in a number of resource blocks (RB) in a subframe for transmitting the physical uplink shared channel (PUSCH), this UE will transmit DRS with length equal to scheduled bandwidth on the $4^{th}$ symbol of the two slots of the subframe. The transmission bandwidth and sub-frames for SRS is configured by eNB. Even if a UE is not scheduled for data or control transmission, it can still transmit the SRS in the last symbol of the second slot in the configured SRS transmission subframes.

For uplink DRS, multiple users use different cyclic shifts of the base sequence and transmit simultaneously only in the case of uplink multi-user MIMO transmission. Otherwise different users are separated by FDM and TDM. More precisely, when a single user is scheduled in a set of resource blocks and a subframe in LTE uplink, as there is only one transmit antenna, only one DRS is needed and consequently only one cyclic shift is used and remaining cyclic shifts are left unused. For SRS on the other hand, multiple users are often scheduled in the same time frequency resource and are separated through different cyclic shifts of the base sequence.

For DRS in the case of MU-MIMO and SRS, cyclic shifts must be allocated to different users in such a way that the corresponding time shift between two users becomes larger than the channel delay spread. Otherwise, channels corresponding to different users will interfere with each other when performing channel estimation at the receiver. Therefore, not all available cyclic shifts of the base sequence can be used in practice.

Assume the case of an LTE system operating at 5 MHz bandwidth with a typical urban (TU) channel model with UE speed 3 km/h. This is a typical wireless communication channel. According to LTE Release 8, there are a total number of eight cyclic shifts available for SRS and DRS, i.e. up to eight users can be code multiplexed together. If consecutive cyclic shifts are allocated in frequency domain to different users, time shift between users is about 32 samples which is smaller than TU channel delay spread (39 samples). Therefore, in order to give enough protection against multi-path for each user at the receiver, at most every other cyclic shift must be allocated to each user which means that only four out of eight users can be code multiplexed together under the assumption of a TU channel.

LTE-Advanced is the evolution of LTE where the user equipment (UE) or a relay node (RN) has up to four transmit antennas and it is important to know the channel from all transmitter antennas to the receiver antennas since this information is used to select modulation and coding scheme for the data transmission and also to select precoding matrix to be used for the transmission. A precoding matrix, taken from a codebook of available precoding matrices, is selected by the receiver to match the channel and improve the quality of the transmission. The data and the DRS are precoded by the same precoding matrix whereas the SRS are not precoded. Hence, one SRS needs to be transmitted from each of the UEs transmission antennas. Let us consider SRS allocation for this case. When user equipments or relay nodes with multiple antennas are supported, a larger number of cyclic shifts must be allocated per UE or RN compared to LTE to distinguish each antenna and each user. In this case, the available eight sounding sequences are rapidly exhausted.

The patent document WO 2009/017363 relates to a method and apparatus for multiplexing a reference signal from a User Equipment (UE), not having any other signal transmission in the respective Transmission Time Interval (TTI) with a reference signal from another UE also having data transmission in the respective TTI, or with the control signal and reference signal from another UE transmitted in the respective TTI. The multiplexed reference signal from the UE not having any other signal transmission in the respective TTI can serve as a sounding reference signal to enable the serving base station to apply link adaption to a subsequent signal transmitted by the UE or it can serve as a reference signal conveying state information, such as resource request or service request. In this document, only the problem of limited number of SRS has been addressed. Other problems still remain.

SUMMARY

A method of assigning reference signals to antennas and nodes in a wireless communication system is provided. The wireless communication system comprises N number of transmitting nodes, where N is an integer and N≥1, said transmitting nodes transmitting reference signals in a first slot and a second slot within sub-frames over the same bandwidth. Each transmitting node has at least one transmit antenna, where different nodes can have different number of transmit antennas, and where said reference signals comprise two different types, the two different types including a first type of reference signals used for demodulation, and a second type of reference signals used for measurements. The method comprises assigning reference signals of said first type to a number of transmitting nodes with at least one transmit antenna in said first and second slot in a predefined bandwidth, and assigning reference signals of said second type to at least one transmitting node with at least two transmit antennas in at least one of said first and second slot in a predefined bandwidth.

It will be noted that the term "comprises/comprising" as used in this description is intended to denote the presence of a given characteristic, step or component, without excluding the presence of one or more other characteristic, features, integers, components or groups thereof. Embodiments of the disclosure will now be described with a reference to the accompanying drawings, in which:

DETAILED DESCRIPTION OF THE PREFERRED EMBODIMENTS

Figure 2:
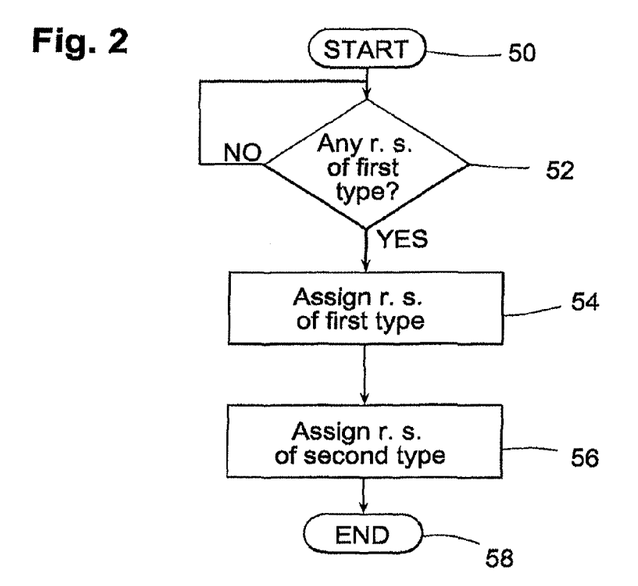
FIG. 2 is a flow chart of a method of assigning reference signals to antennas and nodes in a wireless communication system according to the present disclosure.

In FIG. 2 there is disclosed a flow chart of a method of assigning reference signals to antennas and nodes in a wireless communication system according to the present disclosure. The wireless communication system comprises N number of transmitting nodes, wherein N is an integer, and N≥1. The transmitting nodes are transmitting reference signals in a first slot and second slot within sub-frames, over the same bandwidth. Furthermore, each node has at least one transmit antenna, and different nodes can have different number of transmit antennas. The reference signals are of two different types, a first type of reference signals used for demodulation, and a second type of reference signals used for measurements. The method begins at block 50. The method continues, at block 52, to ask the question: Are there any reference signals of the first type? If the answer is negative, the method continues with performing the step 52 again. If, on the other hand, the answer is affirmative, the method continues, at block 54, with the step: to assign reference signals of the first type to a number of transmitting nodes with at least one transmit antenna in the first and second slot in a predefined bandwidth. Thereafter, the method continues, at block 56, with the step: to assign reference signals of the second type to at least one transmitting node with at least two transmit antennas in at least one of the first and second slot in said predefined bandwidth. The method is completed at block 58.

According to a preferred embodiment of the method according to the present disclosure, the reference signals of the second type corresponding to at least one transmit antenna are assigned to the first slot, and the reference signals of the second type corresponding to the rest of the transmit antennas are assigned to the second slot.

According to another preferred embodiment, the reference signals of the second type corresponding to at least one node are assigned to the first slot, and the reference signals of the second type corresponding to the rest of the nodes are assigned to the second slot.

According to a further preferred embodiment, the reference signals of the second type corresponding to at least one first node are assigned to the first slot, the reference signals of the second type corresponding to at least one second node are assigned to the second slot, and the reference signals of the second type corresponding to at least one transmit antenna, for at least one third node, are assigned to the first slot, and the reference signals of the second type corresponding to the rest of the transmit antennas, for the at least one third node, are assigned to the second slot.

According to a first alternative of the method according to the present disclosure, the reference signals of the second type assigned to the first slot are assigned a value of the cyclic shift different than the value of the cyclic shift assigned to the reference signals of the second type assigned to the second slot.

According to a second alternative, the reference signals of the second type assigned to the first slot are assigned a value of the cyclic shift equal to the value of the cyclic shift assigned to the reference signals of the second type assigned to the second slot.

The assignment in the embodiments described here is performed in LTE or LTE Advanced by control signalling in the physical layer, from the receiver to the transmitter, using the physical downlink control channel (PDCCH) or in another channel at any layer above the physical layer.

Furthermore, if the transmit antennas are virtual antennas, the method also comprises the step:

to apply a precoding matrix/vector to each demodulation reference signal before transmission.

According to a preferred embodiment of the method, the reference signals of the first type are demodulation reference signals (DRS) which are precoded by the precoding matrix/vector, and the reference signals of the second type are sounding reference signals (SRS) which are not precoded by the precoding matrix/vector but transmitted per antenna.

Let us consider the case where there is only one node with multiple antennas to be sounded without loss of generality. In order to sound the channel of a node with multiple antennas, one SRS per antenna is needed. Multiple antennas of one node to be sounded are divided into two antenna groups. Cyclic shifts in the SRS group of first slot are assigned as the SRS of the antennas in the first group and available cyclic shifts in the SRS group of second slot are used for SRS of antennas in the second group. Cyclic shifts for each group of antennas can be same or different. In this case, SRS of each antenna is transmitted once in the sub-frame using SRS and DRS multiplexing. As SRS has lower performance requirement than DRS for demodulation, its transmission could be sparse compared to DRS. In LTE, SRS is only transmitted in the configured sub-frames by eNB to transmit SRS, and SRS only transmits in the last symbol of the configured sub-frame. According to this method, only part of antennas of a certain node transmits SRS on the DRS symbol in one slot.

The term User Equipment (UE) will be used in the following detailed description and associated Figures as an embodiment of a node but as is evident for those skilled in the art, a node in the present disclosure is not limited to user equipments, but also other types of nodes in a wireless communication system such as, for example, a relay node are within the scope of the description and claims.

Figure 3:
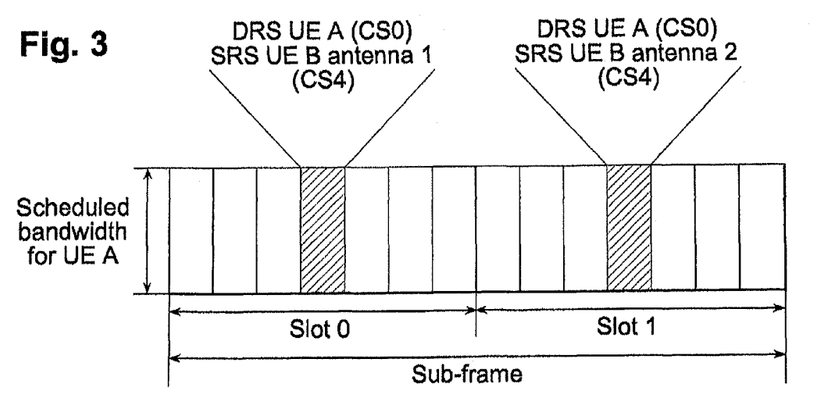
FIG. 3 shows transmission of multiple SRS of one user equipment (UE) with multiple antennas over two slots.

In FIG. 3 there is disclosed transmission of multiple SRS of one UE with multiple antennas over two slots. Assume that the total available number of DRS cyclic shifts is eight, i.e. CS0-CS7 and a number of resource blocks (RB) are scheduled for UE A with a single antenna for Physical Uplink Shared Channel (PUSCH) transmission. CS0 is used for DRS of this UE to demodulate PUSCH, and CS1-CS7 are not used. Unused cyclic shifts CS1-CS7 over two slots form two SRS groups respectively. UE B has two transmit antennas (antenna 1 and antenna 2) and two SRS are needed to sound corresponding channels.

Therefore, unused DRS cyclic shifts can be used for transmitting two SRS of UE B, i.e. the SRS of UE B is multiplexed with the DRS of UE A using CDM. SRS of antenna 1 and antenna 2 are transmitted in slot 1 and slot 2 respectively. The allocated cyclic shifts for the SRS of antenna 1 and antenna 2 could be same or different, e.g. CS4 is used for both antenna 1 and 2, or CS4 and CS5 are used for SRS of antenna 1 and antenna 2 respectively. Interference level between SRS of UE B and DRS of UE A is reduced due to the fact that a better distribution of cyclic shifts over each slot is achieved. When the same cyclic shift is assigned to each group, signalling overhead to indicate the value of cyclic shifts is also reduced because only one cyclic shift needs to be indicated. Moreover, antenna 1 and antenna 2 can send full power which was not the case if allocation were made over a single slot.

Figure 4:
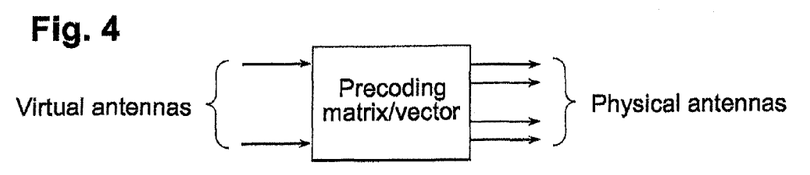
FIG. 4 discloses schematically the relationship between virtual antennas and physical antennas.

The "antenna" mentioned above could be a physical antenna or a virtual antenna. In FIG. 4 there is schematically disclosed the relationship between virtual antennas and physical antennas. For each virtual antenna, the transmitted SRS is a precoded SRS. For instance, UE has four physical antennas, and the two precoding vectors are [ 1 1 1 1 ]T and [ 1 −1 1 −1 ]T or columns of any other orthogonal matrix. IN the first slot, the transmitted SRS is [ 1 1 1 1 ]T*CS4, and the SRS in the second slot is [ 1 −1 1 −1 ]T*CS4.

The two SRS resource groups over two slots can also be assigned in a user wise manner. In this case, multiple users are divided into two groups. Cyclic shift available over the first slot, or the first SRS group, are assigned to the first group of users and cyclic shifts available over the second slot are assigned to the second group of users. This case is based on the assumption that UE needs not transmit SRS two times in one sub-frame as described above, and therefore over each slot different user equipments can be supported. As in previous case, allocated cyclic shift values to user equipments over each slot could be same or different. It is worth mention that the precoded case also can be applied to the user wise separation scenario.

Figure 5:
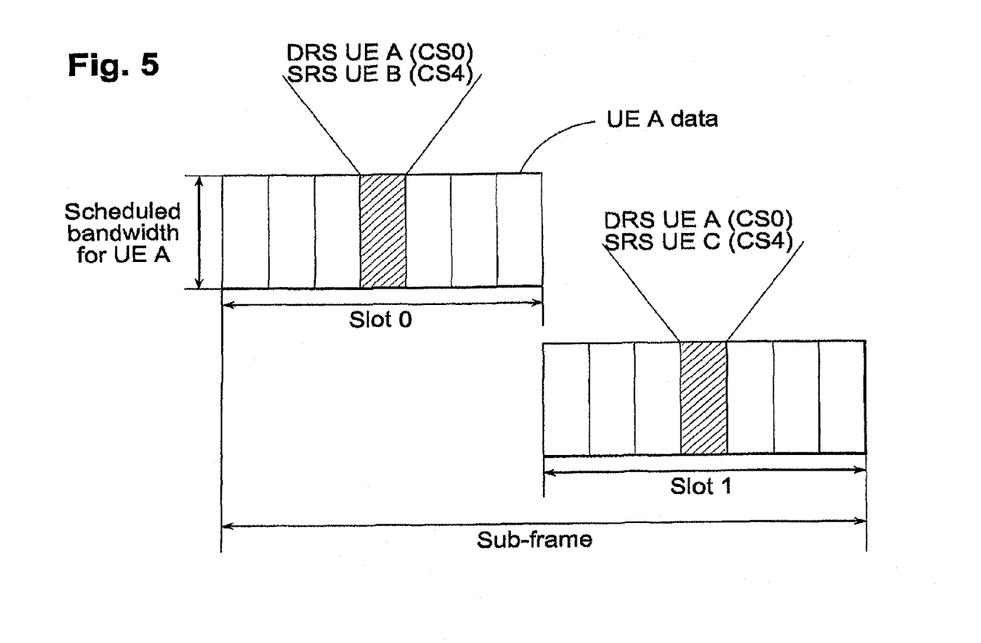
FIG. 5 shows transmission of multiple SRS from different user equipments over two slots.

In FIG. 5 there is disclosed transmission of multiple SRS from different user equipments over two slots. Assume that UE A uses only one cyclic shift CS0 as DRS to demodulate PUSCH and frequency hopping is implemented. For each SRS resource group, there is seven available cyclic shifts, i.e. CS1-CS7. UE B and UE C need to transmit SRS for sounding uplink channel. One SRS is needed for each UE. The SRS of UE B is transmitted in the first slot using the assigned cyclic shift (CS4) from the first SRS resource group, and UE C transmits SRS in the second slot using the assigned cyclic shift (CS4) from the second SRS resource group. The allocated SRS sequence for UE B and UE C could be same or different. The multiplexing between SRS and DRS is shown in FIG. 5.

Now we will describe a scenario where several user equipments with multiple transmit antennas is supported. In this case, there are several user equipments to transmit SRS and each UE needs multiple SRSs. There are two alternative ways to assign the available cyclic shifts in the two SRS resource groups for each UE.

Figure 6:
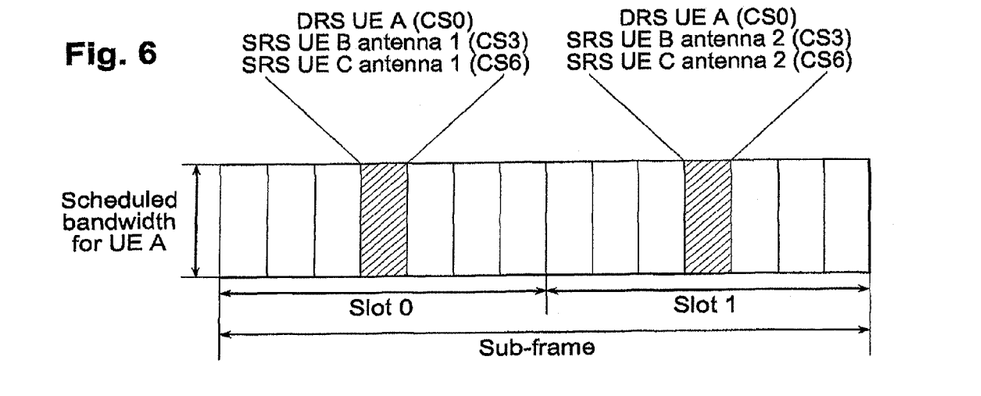
FIG. 6 shows a first alternative of the scenario where several user equipments with multiple transmit antennas must be supported.

In FIG. 6 there is disclosed the first alternative, or antenna wise separation. The multiple antennas of each UE are divided into two groups, and each group of antennas transmits SRS in one slot.

Figure 7:
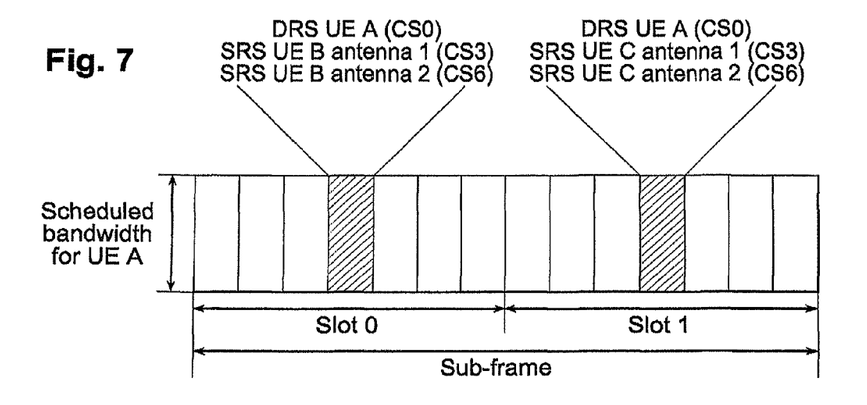
FIG. 7 shows a second alternative of the scenario where several user equipments with multiple transmit antennas must be supported.

In FIG. 7 there is disclosed the second alternative, or user wise separation. All the user equipments to transmit SRS are divided into two groups, and each group of user equipments transmits SRS in one slot.

The assumption on PUSCH transmission UE A is the same as in previous two examples. In this example, no hopping is assumed. There are two user equipments (UE B and UE C) to transmit SRS, and each UE has two transmit antennas.

Now we will describe mixed allocation. In this approach, separation into two different groups to be allocated over two slots is done on both antenna separation basis and user separation basis. Each group contains SRS for some antennas and some users, and is allocated to a different slot as mentioned before.

Figure 8:
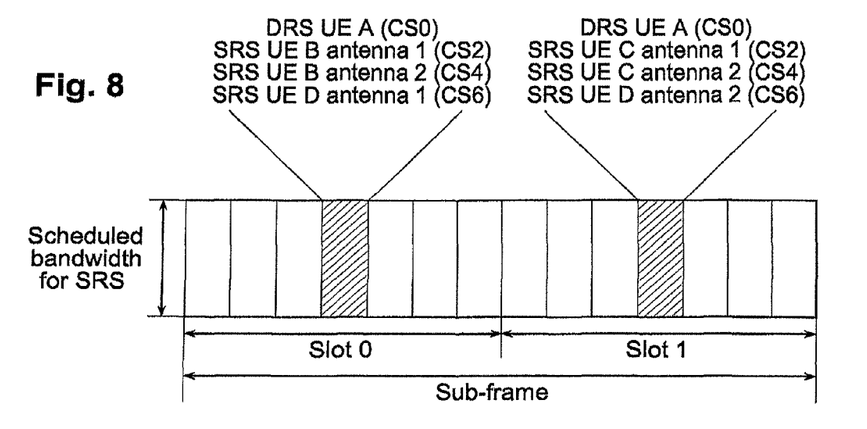
FIG. 8 shows mixed transmission of multiple SRS from different user equipments and different antennas.

In FIG. 8 there is disclosed mixed transmission of multiple SRS from different user equipments and different antennas. Let us consider the case where there is one UE (UE A) sending DRS and there are three different user equipments (UE B, UE C and UE D) each with two transmit antennas to be sounded. UE B and UE C can be separated in a user wise manner, and different antennas corresponding to UE D is separated in an antenna wise manner.

eNB will schedule a number of RBs for DRS transmission and indicate the used cyclic shift for DRS. The scheduling information including RB allocation, index of cyclic shift for DRS, MCS, etc. is transmitted in PDCCH. After UE receives the scheduling information in PDCCH, it will transmit data and DRS in the certain allocated bandwidth. For SRS transmission, PDCCH can be used to indicate the allocated bandwidth and index of cyclic shift for SRS or this information can be configured by eNB through higher layer signalling, e.g. RRC signalling.

Figure 9:
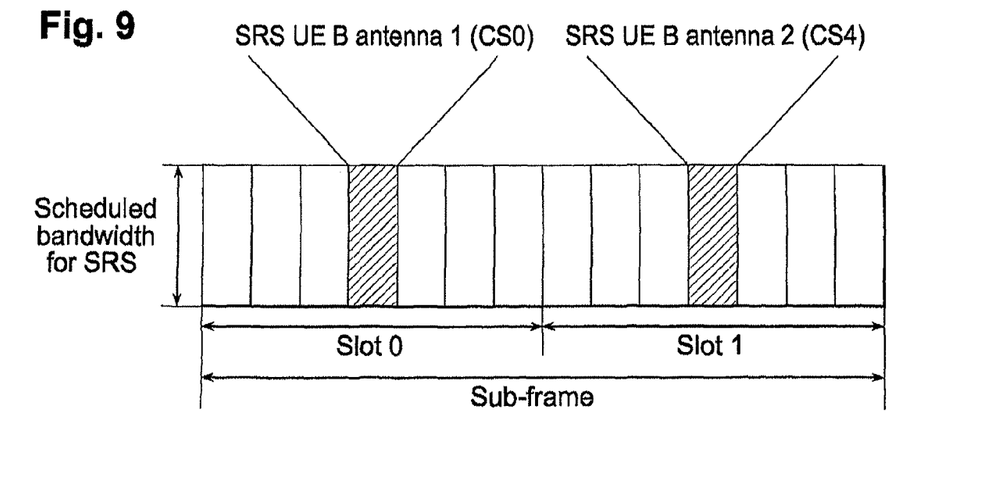
FIG. 9 shows a scenario where only SRS is transmitted on the DRS symbol of each slot.

All the above given examples assume that there is one UE to be scheduled. In practice, sometimes no UE is scheduled. For this case, all the cyclic shifts are available and can be used for transmitting SRS, i.e. only SRS is transmitted in the DRS symbol place of each slot, which is illustrated in FIG. 9.

Figure 10:
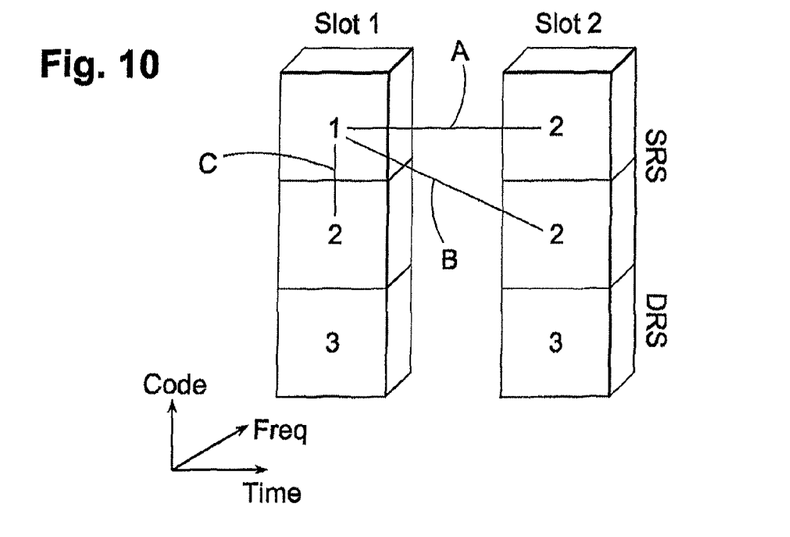
FIG. 10 discloses schematically different methods of assigning reference signals over time slots using code multiplexing for different nodes with multiple antennas.

In FIG. 10 there are schematically disclosed different methods of assigning reference signals over time slots using code multiplexing for different nodes with multiple antennas. FIG. 10 summarises examples and scenarios in one scheme by making abstraction on user wise separation or antenna wise separation. Different groups of sounding reference signals corresponding to users or antennas are shown by number 1, 2 and 3. As mentioned before, sounding is multiplexed with demodulation reference signal. Method C indicates the case where allocation of sounding reference signals is done over only one slot. In this method, group 1, 2 and 3 are code multiplexed together. Method B and method A are both describing the cases where allocation of sounding is made over two time slots. Method B indicates the case where allocation is made over two slots with group 1 and 2 using different cyclic shifts. In this case, cyclic shifts are distributed over two slots providing a better separation between them and less interference comparing to the first case. Method A describes the case of allocation over two slots where only cyclic shift is used for different allocation. As mentioned before, with this solution we guarantee less interference and less signalling overhead.

Figure 11:
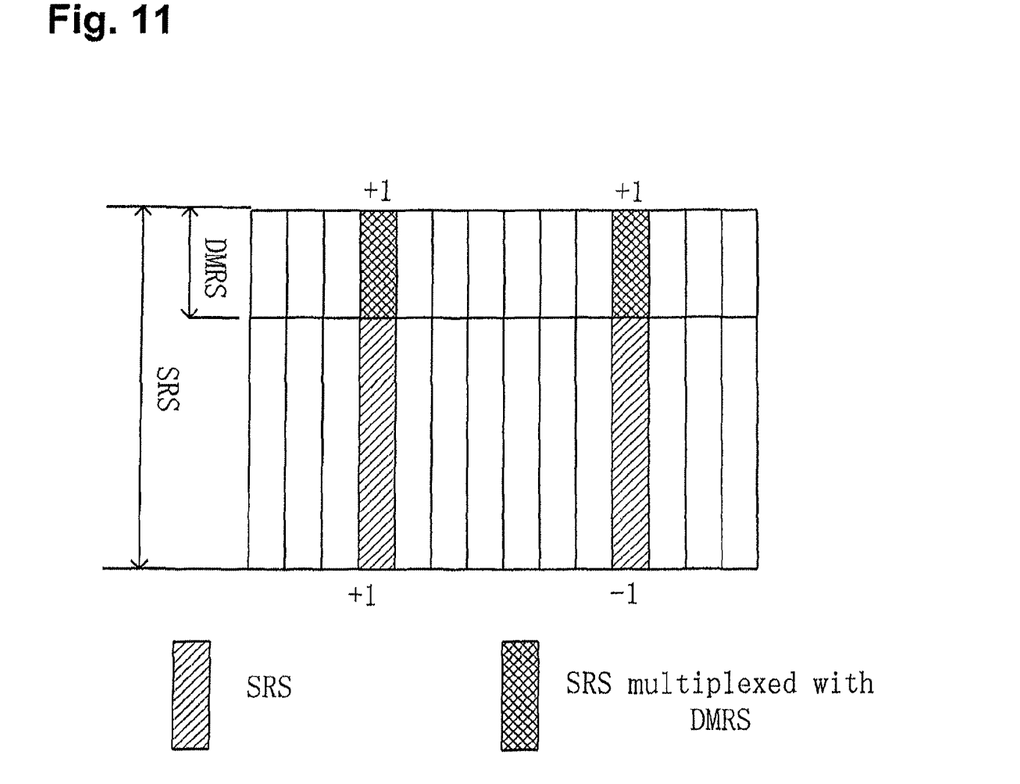
FIG. 11. discloses the case where SRS and DRS uses different bandwidth allocation orthogonalized by some code in time domain.

In FIG. 11 is disclosed where the SRS bandwidth and DMRS bandwidth are un-equal as long as they remain orthogonal. Preferably, this orthogonality property is achieved by means of an orthogonal cover code in time domain.

Figure 12:
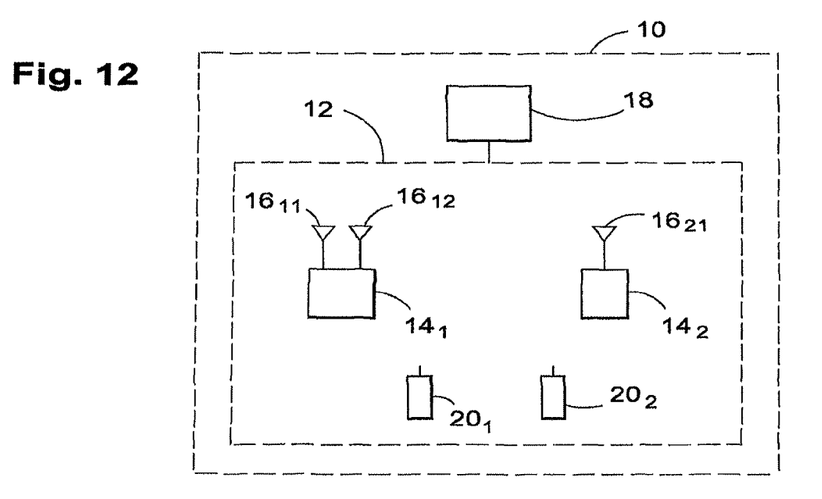
FIG. 12 is a block diagram of a system operable to assign reference signals to antennas and nodes in a wireless communication system according to the present disclosure.

In FIG. 12 there is disclosed a block diagram of a system 10 operable to assign reference signals to antennas and nodes in a wireless communication system 12 according to the present disclosure. In the general case, the wireless communication system 12 comprises N number of transmitting nodes $14_1, \ldots, 14_N$, wherein N is an integer, and N≥1. In FIG. 12 there are only disclosed two transmitting nodes $14_1, 14_2$ for the sake of simplicity. The transmitting nodes are operable to transmit reference signals in a first slot and a second slot within sub-frames, over the same bandwidth. Each transmitting node has at least one transmit antenna $16_{11}, \ldots, 16_{N1}, 16_{N2}$, wherein different nodes can have different number of transmit antennas. In the system 10 disclosed in FIG. 12, the transmitting node $14_1$ has two transmit antennas $16_{11}$ and $16_{12}$, and the transmitting node $14_2$ has only one transmit antenna $16_{21}$. It is pointed out that the reference signals are of two different types, a first type of reference signals used for demodulation, and a second type of reference signals used for measurements. As is apparent in FIG. 12, the system 10 also comprises a control means 18 connected to the wireless communication system 12, and operable to assign reference signals of the first type to a number of transmitting nodes $14_x$, in FIG. 12, $14_2$ with at least one transmit antenna $16_{21}$ in the first slot and in the second slot, in a predefined bandwidth. The control means 18 is also operable to assign reference signals of the second type to at least one transmitting node $14_y$, in FIG. 12, $14_1$, with at least two transmit antennas $16_{11}$ and $16_{12}$ in at least one of the first and second slot in the predefined bandwidth.

According to a preferred embodiment of the system 10 according to the present disclosure, the control means 18 is also operable to assign the reference signals of the second type corresponding to at least one transmit antenna 1611 to the first slot, and to assign the reference signals of the second type corresponding to the rest of the transmit antennas 1612 to the second slot.

According to another embodiment, the wireless communication system 12 comprises, in the general case, P number of scheduled user equipments $20_1, \ldots, 20_P$, wherein P is an integer, and P≥2. In FIG. 12, there are only disclosed two scheduled user equipments $20_1$ and $20_2$. The control means 18 is also operable to assign reference signals of the second type corresponding to at least one scheduled user equipment $20_1$ to the first slot. The control means 18 is also operable to assign the reference signals of the second type corresponding to the rest of the scheduled user equipments $20_2$ to the second slot.

According to another embodiment of the system 10, the control means 18 is also operable to assign the reference signals of the second type corresponding to at least one first scheduled user equipment to the first slot, to assign reference signals of the second type corresponding to at least one second scheduled user equipment to the second slot. The control means 18 is also operable to assign the reference signals of the second type corresponding to at least one transmit antenna, for at least one third scheduled user equipment, to the first slot, and to assign the reference signals of the second type corresponding to the rest of the transmit antennas, for the at least one third scheduled user equipment, to the second slot.

Furthermore, according to another embodiment of system 10, the control means 18 is also operable to assign the reference signals of the second type assigned to the first slot a value of the cyclic shift different than the value of the cyclic shift assigned to the reference signals of the second type assigned to the second slot.

According to another embodiment of system 10, the control means 18 is also operable to assign a value of the cyclic shift to the reference signals of the second type equal to the value of the cyclic shift assigned to the reference signals of the second type assigned to the second slot.

Furthermore, the reference signals of the first type may be demodulation reference signals (DRS), and the reference signals of the second type may be sounding reference signals (SRS).

Figure 13:
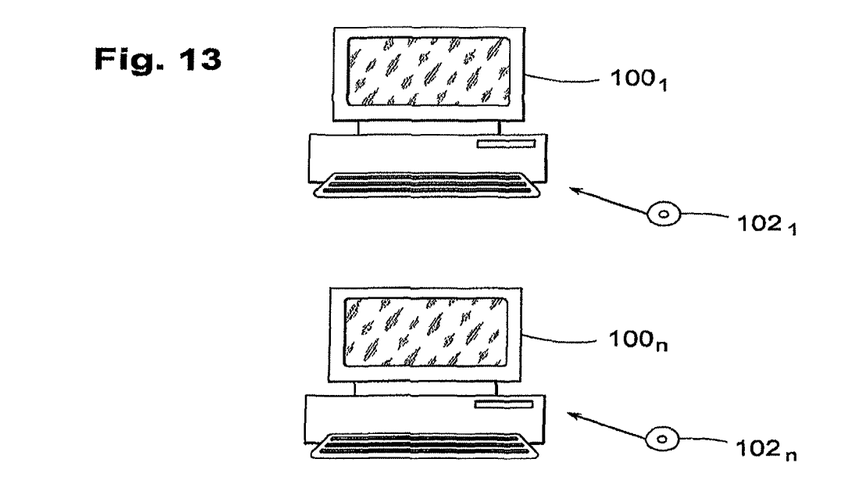
FIG. 13 schematically shows a number of computer program products according to the present disclosure.

In FIG. 13, some computer program products $102_1, \ldots, 102_n$ according to the present disclosure are schematically shown. In FIG. 13, n different digital computers $100_1, \ldots, 100_n$ are shown, wherein n is an integer. In FIG. 13, n different computer program products $102_1, \ldots, 102_n$ are shown, here shown in the form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for performing all the steps according to FIG. 2, when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The disclosure is not limited to the described embodiments. It will be evident for those skilled in the art that many different modifications are feasible within the scope of the following Claims.

The invention claimed is:

1. A method of assigning reference signals to antennas and nodes in a wireless communication system, the wireless communication system comprising:
N number of transmitting nodes, wherein N is an integer and N≥1, said transmitting nodes transmitting reference signals in a first slot and a second slot within sub-frames over the same bandwidth,
wherein each transmitting node has at least one transmit antenna, wherein different nodes can have different number of transmit antennas, and
wherein said reference signals comprise two different types, the two different types including a first type of reference signals used for demodulation, and a second type of reference signals used for measurements;
wherein the method comprises:
assigning reference signals of said first type to a number of transmitting nodes with at least one transmit antenna in said first and second slot in a predefined bandwidth; and
assigning reference signals of said second type to at least one transmitting node with at least two transmit antennas in at least one of said first and second slot in a predefined bandwidth;
wherein:
reference signals of said second type corresponding to at least one first nodes are assigned to said first slot,
reference signals of said second type corresponding to at least one second node are assigned to said second slot, and
the reference signals of said second type corresponding to at least one transmit antenna, for at least one third node, are assigned to said first slot, and wherein said reference signals of said second type corresponding to the rest of said transmit antennas, for said at least one third node, are assigned to said second slot.

2. The method of assigning reference signals according to claim 1, wherein the predefined bandwidth for assigning the reference signals of said first type and the predefined bandwidth for assigning the reference signals of said second type are equal.

3. The method of assigning reference signals to antennas and nodes in a wireless communication system according to claim 1, wherein said reference signals of said second type corresponding to at least one transmit antenna are assigned to said first slot, and
said reference signals of said second type corresponding to the rest of said transmit antennas are assigned to said second slot.

4. The method of assigning reference signals to antennas and nodes in a wireless communication system according to claim 1, wherein:
said reference signals of said second type corresponding to at least one node are assigned to said first slot, and
said reference signals of said second type corresponding to the rest of said nodes are assigned to said second slot.

5. The method of assigning reference signals to antennas and nodes in a wireless communication system according to claim 1, wherein said reference signals of said second type assigned to said first slot are assigned a value of the cyclic shift different from the value of the cyclic shift assigned to said reference signals of said second type assigned to said second slot.

6. The method of assigning reference signals to antennas and nodes in a wireless communication system according to claim 1, wherein said reference signals of said second type assigned to said first slot are assigned a value of the cyclic shift equal to the value of the cyclic shift assigned to said reference signals of said second type assigned to said second slot.

7. The method of assigning reference signals to antennas and nodes in a wireless communication system according to claim 1, wherein said antennas comprise virtual antennas, and wherein said method further comprises applying a precoding matrix/vector to each reference signal before transmission.

8. The method of assigning reference signals to antennas and nodes in a wireless communication system according to claim 1, wherein said reference signals of said first type are demodulation reference signals.

9. The method of assigning reference signals to antennas and nodes in a wireless communication system according to claim 1, wherein said reference signals of said second type are sounding reference signals.

10. The method of assigning reference signals to antennas and nodes in a wireless communication system according to claim 1 wherein said reference signals of first type is precoded by a precoding matrix/vector whereas said reference signal of second type is not precoded by a precoding matrix/vector.

11. A system operable to assign reference signals to antennas and nodes in a wireless communication system comprising N number of transmitting nodes,
wherein N is an integer and N≥1, said transmitting nodes operable to transmit reference signals in a first and a second slot within sub-frames over the same bandwidth,
wherein each node has at least one transmit antenna, wherein different nodes can have different number of transmit antennas,
wherein said reference signals comprise two different types, the two different types including a first type of reference signals used for demodulation and a second type of reference signals used for measurements; and
wherein said system comprises:
control means operable to assign reference signals of said first type to a number of transmitting nodes with at least one transmit antenna in said first slot and in said second slot in a predefined bandwidth,
wherein the control means is further operable to assign reference signals of said second type to at least one transmitting node with at least two transmit antennas in at least one of said first and second slot in a predefined bandwidth;
wherein:
reference signals of said second type corresponding to at least one first nodes are assigned to said first slot,
reference signals of said second type corresponding to at least one second node are assigned to said second slot, and
said reference signals of said second type corresponding to at least one transmit antenna, for at least one third node, are assigned to said first slot, and wherein said reference signals of said second type corresponding to the rest of said transmit antennas, for said at least one third node, are assigned to said second slot.

12. The system according to claim 11, wherein the control means is operable to assign reference signals of said first type and said second type in a same predefined bandwidth.

13. The system operable to assign reference signals to antennas and nodes in a wireless communication system according to claim 11, wherein said control means is operable to assign said reference signals of said second type corresponding to at least one transmit antenna to said first slot, and said control means is operable to assign said reference signals of said second type corresponding to the rest of said transmit antennas to said second slot.

14. The system operable to assign reference signals to antennas and nodes in a wireless communication system according to claim 11, wherein said wireless communication system comprises P number of scheduled nodes, wherein P is an integer, and P≥2, said control means is operable to assign said reference signals of said second type corresponding to at least one scheduled node to said first slot, and said control means is operable to assign said reference signals of said second type corresponding to the rest of said scheduled nodes to said second slot.

15. The system operable to assign reference signals to antennas and nodes in a wireless communication system according to claim 11, wherein said control means is operable to assign said reference signals of said second type assigned to said first slot a value of the cyclic shift different from the value of the cyclic shift assigned to said reference signals of said second type assigned to said second slot.

16. The system operable to assign reference signals to antennas and nodes in a wireless communication system according to claim 11, wherein said control means is operable to assign a value of the cyclic shift to said reference signals of said second type equal to the value of the cyclic shift assigned to said reference signals of said second type assigned to said second slot.

17. The system operable to assign reference signals to antennas and nodes in a wireless communication system according to claim 11, wherein said reference signals of said first type comprise demodulation reference signals and said reference signals of said second type comprise sounding reference signals.

18. A computer program product stored in an internal memory of a digital computer, wherein the internal memory is coupled to a processor and the digital computer is coupled to a wireless communication system, wherein the wireless communication system comprises:

N number of transmitting nodes, wherein N is an integer and N≥1, said transmitting nodes transmitting reference signals in a first slot and a second slot within sub-frames over the same bandwidth, wherein each transmitting node has at least one transmit antenna, wherein different nodes can have different number of transmit antennas, wherein said reference signals are comprise two different types, the two different types including a first type of reference signals used for demodulation, and a second type of reference signals used for measurements; and the computer program product comprises logic when executed causes the processor to:

assign reference signals of said first type to a number of transmitting nodes with at least one transmit antenna in said first and second slot in a predefined bandwidth; and assign reference signals of said second type to at least one transmitting node with at least two transmit antennas in at least one of said first and second slot in a predefined bandwidth;

wherein:

reference signals of said second type corresponding to at least one first nodes are assigned to said first slot, reference signals of said second type corresponding to at least one second node are assigned to said second slot, and said reference signals of said second type corresponding to at least one transmit antenna, for at least one third node, are assigned to said first slot, and wherein said reference signals of said second type corresponding to the rest of said transmit antennas, for said at least one third node, are assigned to said second slot.

* * * * *